Dec. 1, 1953 H. R. KIRSTEN Re. 23,747

LOCK BUCKLE

Original Filed Oct. 25, 1950

INVENTOR
HUGO R. KIRSTEN
BY Gustav A. Drews
his ATTORNEY

Reissued Dec. 1, 1953

Re. 23,747

UNITED STATES PATENT OFFICE 23,747

LOCK BUCKLE

Hugo R. Kirsten, Brooklyn, N. Y.

Original No. 2,618,826, dated November 25, 1952, Serial No. 192,040, October 25, 1950. Application for reissue August 7, 1953, Serial No. 373,079

6 Claims. (Cl. 24—167)

Matter enclosed in heavy brackets [ ] appears in the original patent but forms no part of this reissue specification; matter printed in italics indicates the additions made by reissue.

This invention relates to locks in general and more especially to locks for belt buckles such as used on belts or strait jackets for obstreperous and demented persons.

Among the objects of the present invention it is aimed to provide an improved lock particularly adapted for belt buckles such as disclosed in applicant's copending application for patent Serial No. 792,980, filed December 20, 1947, which matured in Letters Patent No. 2,536,063, dated January 2, 1951, the parts of which lend themselves to mass production at a comparatively low cost, both with regard to manufacture of the parts, but also with regard to the assembly of the same, and which lock when equipped on a belt will have not only all of the advantages of applicant's earlier construction disclosed in the aforesaid patent application, but also many additional advantages.

These and other features, capabilities and advantages of the present invention will appear from the subjoined detailed description of one specific embodiment thereof illustrated in the accompanying drawings, in which Fig. 1 is a plan view, and Fig. 2 a side elevation of a belt buckle equipped with the improved lock secured to a belt partly broken away.

Figure 1:
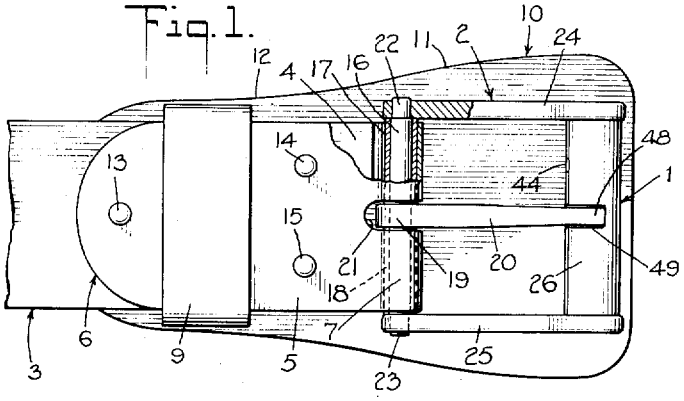
Figure 2:
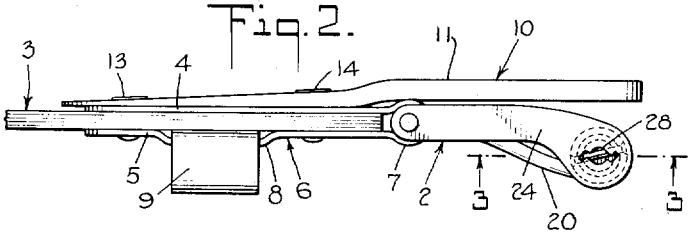

In Figs. 1 and 2 the lock 1 constituting the main feature of the present invention is shown equipped on a belt buckle 2 connected to a belt 3 composed of leather or the like.

The end of the belt 3 is positioned between the overlapping plate portions 4 and 5 of the metal plate 6, being rounded at 7, and outwardly expressed at 8 in the plate portion 5 to receive the ends of the leather loop 9, which ends are disposed between the belt 3 and the extension 8 of the plate portion 5. Preferably as shown, there is also provided a leather extension 10 with an enlargement 11 disposed under the buckle 2 and the narrow portion 12 positioned on the outer face of the plate portion 4 with rivets 13, 14 and 15 securing the narrow portion 12 and plate portions 4 and 5 to the end of the belt 3 and to one another, as shown in Figs. 1 and 2. The buckle 2 preferably has a chape or cross bar 16 extending through the rounded or looped portion 7 of the plate 6 with the sleeves 17 and 18 to either side of the enlargement 19 of the tongue 20, the enlargement 19 being pivotally mounted on the chape 16 between the sleeves 17 and 18. The enlargement 19 of the tongue 20 as shown in Fig. 1 is disposed on the chape 16 movable in the recess 21 formed in the metal plate 6. The ends of the chape 16 are diminished as shown at 22 and 23 to enter the openings in the arms 24 and 25 of the buckle 2, which arms 24 and 25 are preferably cast integral with the cylinder 26. The end of the cylinder 26 adjacent the arm 25 has a large opening 27. The other end of the cylinder 26 has a wave-like key receiving opening 28 conforming in outline to the cross sections of the blade portion, *driving part or bit* 29 of the key 30. In the cylinder 26 there is rotatably and slidably mounted the locking barrel or bolt 31 which is resiliently urged toward the key opening 28 by the coil spring 32 disposed between the closed end 33 of the barrel 31 and the plug 34 which is fixed in the large opening 27 of the cylinder 26.

The bolt 31 in the present instance has two slots or openings 35 and 36 diametrically opposed to one another and extending axially inward from the end 37 of the bolt 31. The axially inner ends of the slots 35 and 36 have intermediate projections 38 and 39 formed by the pairs of concave inner ends 40, 41, and 42, 43, of the slots 35 and 36, respectively.

Figure 3:
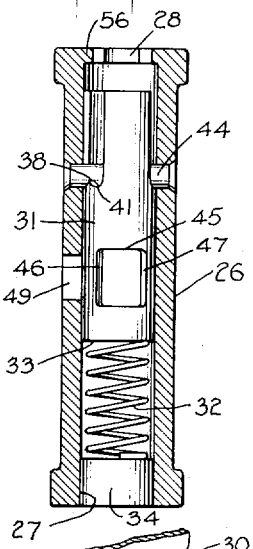
Fig. 3 is a section on the line 3—3 of Fig. 2.

The cylinder 26, see Fig. 3, has a pin 44 extending diametrically across the same and through the slots 35 and 36. When the spring 32 is in position, due to the concave faces of the pairs of depressions 40, 41, and 42, 43, the pin 44 will either rest in the depression 40 of the recess 35, and the depression 43 of the recess 36 as shown in Fig. 4, or in the depression 41 of the recess 35 [of] *and* the depression 42 of the recess 36, the concave faces of the recesses 40, 41, and 42, 43, serving as cams on the pin 44.

Figure 4:
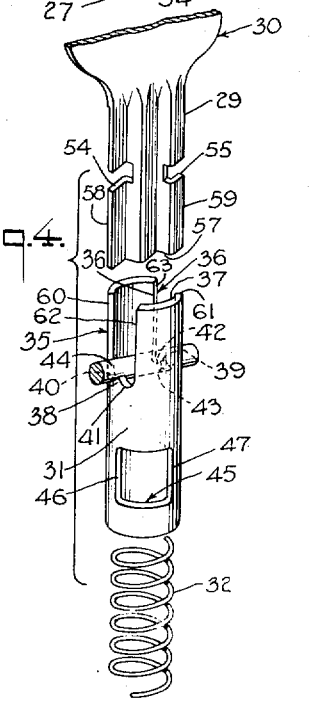
Fig. 4 is an exploded perspective view of the working parts of the lock with a portion of the key.

As shown in Fig. 4, the bolt 31 also has an opening 45 having the axially extending edges or lips 46 and 47 to cooperate with the end 48 of the tongue 20, the lip 46 constituting the first shoulder and the lip 47 constituting the second shoulder.

The opening 45 is predetermined in position relative to the recesses 35 and 36, depending upon the path of movement of the end 48 of the tongue 20. The cylinder 26 has a slot 49 formed therein, in length in the present instance a little more than a quadrant of the cylindrical wall of the cylinder 26 and in width conforming to the width of the tongue 20 so that it will just clear the same, see the position of the tongue in the opening 49 in Fig. 1. The length of the slot 49 in turn similarly conforms to the conformation of the end 48 of the tongue 20 so that in locked position, see Fig. 6, the end 48 of the tongue will just fill up the opening 49 both lengthwise and crosswise.

The end 48 of the tongue 20 is bifurcated having the two projections or fingers 50 and 51 forming the mouth 52. The outer face 53 of the finger 50 is bevelled or chamfered to form a cam face to cooperate with the edge 47 of the opening 45, see Fig. 7, to deflect it into the position shown in Fig. 8 against the tension of the spring 32, and then upon the continued inward pressure on the tongue 20 the edge 46 of the opening 45 will be engaged to return the bolt 31 into the locked position shown in Fig. 7 where the edge 47 will be positioned in the mouth 52 of the tongue 20, see the position shown in Fig. 6.

Figure 5:
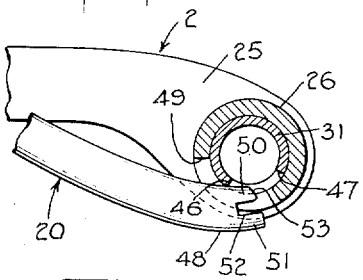
Figs. 5 and 6 are fragmental side views partly in section showing the lock successively in open position and in final locked position, with the tongue engaging the bolt in locked position in Fig. 6.
Figure 7:
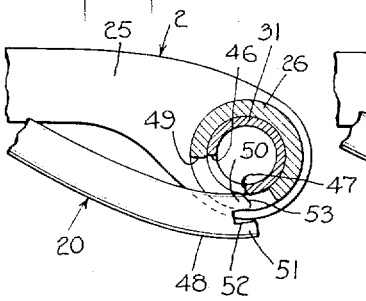
Figs. 7 and 8 are fragmental side views partly in section showing the lock successively in locked position with the tongue out of locked relationship with the bolt, and the lock in prelocked position when the lock is momentarily moved from locked position before being moved into locked position by the tongue.
Figure 8:
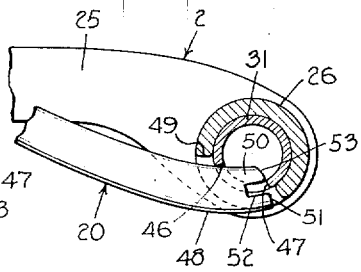

When it is desired to unlock or free the tongue 20 it will only be necessary to rotate the bolt 31 in a counterclockwise direction against the tension of the spring 32 where the edge 46 will flip the tongue 20 outwardly into the position shown in Fig. 5. On the other hand, when the lock is in the open position shown in Fig. 5, and it is desired to lock the tongue 20, it is only necessary to press the tongue 20 against the edge 46 of the opening 45 and against the tension of the spring 32 until the pin 44 rides over the projections 38 and 39 into the position in the depressions 41 and 42 from the position in the depressions 40 and 43, that shown in Fig. 4. In order to angularly rotate the bolt 31, the blade of a key, such as the blade 29, will be used. The blade 29 is preferably wave-like in cross section and has two slots 54 and 55 to clear the end wall 56 of the cylinder 26 when the blade 29 is inserted in the key slot 28 in a position where the recesses 54 *and* [anad] 55 register with the end wall 56. In such position, the lower end 57 of the key *bit* [blade] will clear the pin 44 and *due to the clearances or openings 35, 36,* the wings 58 *and* [anad] 59 will be in position to engage the axially extending edges of the slots 35 and 36. If the bolt 31 were in the position shown in Fig. 4 relative to the pin 44, and the wing portions 58 and 59 of the blade 29 were positioned in the recesses 35 and 36, then if the key 30 were turned so that the *wing* [blade] 58 would engage the edge 60 of the recess 35 and the wing portion 59 would engage the edge 61 of the recess 36, and the key 30 were rotated clockwise, it would cause the bolt 31 to move inwardly against the tension of the spring 32 due to the projections 38 and 39 until the pin 44 would register with the depressions 41 and 42 of the recesses 35 and 36, respectively. With reference to Figs. 5 and 7, when the key was rotated as just described, the bolt 31 would move from the position shown in Fig. 5 to that shown in Fig. 7.

Figure 6:
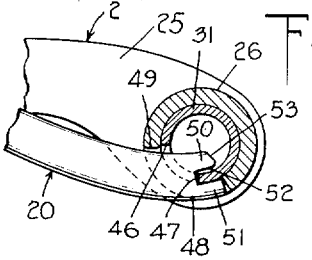

In turn, should it be desirable to unlock or free the tongue 20 from the position shown in Fig. 6, the key 30 would be rotated in a counterclockwise direction where the wing portion 58 would engage the edge or shoulder 62 of the recess 35, and the wing portion 59 would engage the edge or shoulder 63 of the recess 36 to rotate the bolt 31 against the tension of the spring 32 where the pin 44 would move from a position resting in the depressions 41 and 42 to the position shown in Fig. 4 where it rests in the depressions 40 and 43 and the edge 46 of the opening 45 would engage the tongue 20 to flip it out into the position shown in Fig. 5.

It is obvious that the present lock may be used to advantage not only with belts, but also with mail bags, ladies' hand bags, trunks and the like, without departing from the general spirit of the invention.

It is obvious that various changes and modifications may be made to the details of construction without departing from the general spirit of the invention as set forth in the appended claims.

I claim:

1. The combination of a frame having a pivotally mounted tongue, said tongue having two jaw forming projections at the free end thereof, a cylinder having a closure at one end thereof and an opening in the cylindrical wall thereof, a cylindrical barrel having a cylindrical wall rotatably and slidably mounted in said cylinder, said barrel having an abutment at one end and two diametrically opposed recesses in its cylindrical wall terminating in one end of the barrel with guide shoulders formed by axially inwardly extending depressions in the troughs of the recesses, a pin secured to the wall of the cylinder and extending diametrically through said recesses, a spring tensed between the closure at one end of said cylinder and the abutment of said barrel normally to urge the barrel toward the other end of said cylinder and said guide shoulders into engagement with said pin, said barrel having an opening in its cylindrical wall defined by an axially extending first shoulder and an axially extending second shoulder, said first shoulder exposed at the opening in said cylinder when said pin rests in one depression in each of said recesses and the barrel is in locked position, said second shoulder exposed at the opening in the wall of said cylinder when said pin rests in the other depression of each of said recesses and said barrel is in unlocked position to receive said tongue to enable pressure on said tongue to rotate said barrel into locking engagement with the jaw of said tongue, there being a key slot formed in said other end of said cylinder, said barrel having axially extending shoulders defining the sides of said recesses, the key slot being in alinement with said recesses and enabling the blade of a key to extend into said cylinder to engage the *axially* [axial] extending shoulders to rotate said barrel either into locked or unlocked position.

2. The combination as set forth in claim 1 in which a projection defines the depressions of each recess from one another which cooperate with said pin and said spring to anchor the barrel either in locked or unlocked position.

3. The combination as set forth in claim 1 characterized by a projection defining the depressions of each recess from one another to enable the pin and spring to anchor the barrel in locked position when the pin rests in the depressions which are disposed to the counterclockwise side of the intervening projections and to anchor the barrel in unlocked position when the pin rests in the depressions on the clockwise side of the intervening projections.

4. The combination as set forth in claim 1 in which a plug constitutes said abutment and closes said one end of said cylinder and in which the other end of said cylinder in which the key slot is formed is integral with the cylinder.

5. The combination of a frame having a pivotally mounted tongue, said tongue having two jaw forming projections at the free end thereof, a cylinder having a closure *at* [of] one end thereof and an opening in the cylindrical wall thereof, a cylindrical barrel having a cylindrical wall rotatably and slidably mounted in said cylinder, said barrel having an abutment at one end and two diametrically opposed openings in its cylindrical wall with guide shoulders formed by axially inwardly extending depressions in the troughs of the barrel openings, a pin secured to the wall of the cylinder and extending diametrically through said barrel openings, a spring tensed between the closure at one end of said cylinder and the abutment of said barrel normally to urge the barrel toward the other end of said cylinder and said guide shoulders into engagement with said pin, said barrel having an opening in its cylindrical wall defined by an axially extending first shoulder and an axially extending second shoulder, said first shoulder exposed at the opening in said cylinder when said pin rests in one depression in each of said barrel openings and the barrel is in locked position, said second shoulder exposed at the opening in the wall of said cylinder when said pin rests in the other depression of each of said barrel openings and said barrel is in unlocked position to receive said tongue to enable pressure on said tongue to rotate said barrel into locking engagement with the jaw of said tongue, there being a key slot formed in said other end of said cylinder, said barrel having axially extending edges at its other end with spaces therebetween, the key slot being in alinement with said spaces and enabling the blade of a key to extend into said cylinder to engage the axially extending *edges* [shoulders] to rotate said barrel either into locked or unlocked position.

*6. The combination of a frame having a pivotally mounted tongue, said tongue having two jaw*

*forming projections at the free end thereof, a cylinder having a closure at one end thereof and an opening in the cylindrical wall thereof, a cylindrical barrel having a cylindrical wall rotatably and sidably mounted in said cylinder, said barrel having an abutment at one end and two diametrically opposed openings in its cylindrical wall with guide shoulders formed by axially inwardly extending depressions in the troughs of the barrel openings, a pin secured to the wall of the cylinder and extending diametrically through said barrel openings, a spring tensed between the closure at one end of said cylinder and the abutment of said barrel normally to urge the barrel toward the other end of said cylinder and said guide shoulders into engagement with said pin, said barrel having an opening in its cylindrical wall defined by an axially extending first shoulder and an axially extending second shoulder, said first shoulder exposed at the opening in said cylinder when said pin rests in one deperession in each of said barrel openings and the barrel is in locked position, said second shoulder exposed at the opening in the wall of said cylinder when said pin rests in the other depression of each of said barrel openings and said barrel is in unlocked position to receive said tongue to enable pressure on said tongue to rotate said barrel into locking engagement with the jaw of said tongue, there being a key opening formed in said other end of said cylinder, said barrel having axially extending edges at its other end with clearances therebetween, the key opening being in alinement with said clearances and enabling the bit of a key to extend into said cylinder to engage the axially extending edges to rotate said barrel either into locked or unlocked position.*

HUGO R. KIRSTEN.

References Cited in the file of this patent or the original patent

UNITED STATES PATENTS

| Number | Name | Date |
|---|---|---|
| 661,974 | Goozey | Nov. 20, 1900 |
| 2,536,063 | Kirsten | Jan. 2, 1951 |